(12) United States Patent
Bonn

(10) Patent No.: US 8,496,839 B2
(45) Date of Patent: Jul. 30, 2013

(54) METHOD FOR FILTERING A SUSPENSION AND FILTER DEVICE

(75) Inventor: Heinz Bonn, Kreuzau-Winden (DE)

(73) Assignee: Outotec Oy, Lappeenranta (FI)

( * ) Notice: Subject to any disclaimer, the term of this patent is extended or adjusted under 35 U.S.C. 154(b) by 689 days.

(21) Appl. No.: 12/653,108

(22) Filed: Dec. 8, 2009

(65) Prior Publication Data

US 2010/0155344 A1 Jun. 24, 2010

Related U.S. Application Data

(63) Continuation of application No. PCT/EP2008/056538, filed on May 28, 2008.

(30) Foreign Application Priority Data

Jun. 8, 2007 (DE) .......................... 10 2007 027 032

(51) Int. Cl.
*B01D 35/00* (2006.01)
*B01D 37/02* (2006.01)

(52) U.S. Cl.
USPC ........... 210/791; 210/800; 210/204; 210/210; 210/321.75; 210/321.84; 210/350; 210/500.21

(58) Field of Classification Search
None
See application file for complete search history.

(56) References Cited

FOREIGN PATENT DOCUMENTS

| BE | 1 010 181 A3 | 2/1998 |
|---|---|---|
| DE | 199 56 617 A1 | 6/2001 |
| DE | 103 03 817 A1 | 8/2004 |
| EP | 0 852 962 A | 7/1998 |
| JP | 62 155909 A | 7/1987 |

OTHER PUBLICATIONS

Machine Translation of ( DE 103 03 817 A1 ), reference cited on IDS and provided by applicant in file.*
DE10303817A1 Human Translation.*

* cited by examiner

*Primary Examiner* — Krishnan S Menon
*Assistant Examiner* — Allison M Gionta
(74) *Attorney, Agent, or Firm* — Von Rohrscheidt Patents

(57) ABSTRACT

A filter device including at least one filter chamber between a filter plate and a counter plate when the device is closed, into which chamber a suspension can be inducted on a cake side of a filter cloth through at least one filling shoe anchored in the filter plate and clamping the cloth with the filter plate in a sealing manner. The suspension permeates the cloth to the filtrate side, wherein the suspension solid content deposits on the cloth as a filter cake, and the filter and counter plates are offset from each other when the device is open, and the cake is removable from the chamber. In order to simplify the disassembly of the cloth, the shoe is movably anchored in the filter plate, and the shoe is automatically lifted off from the filter plate and the clamping of the filter cloth is released when the device is opened.

6 Claims, 3 Drawing Sheets

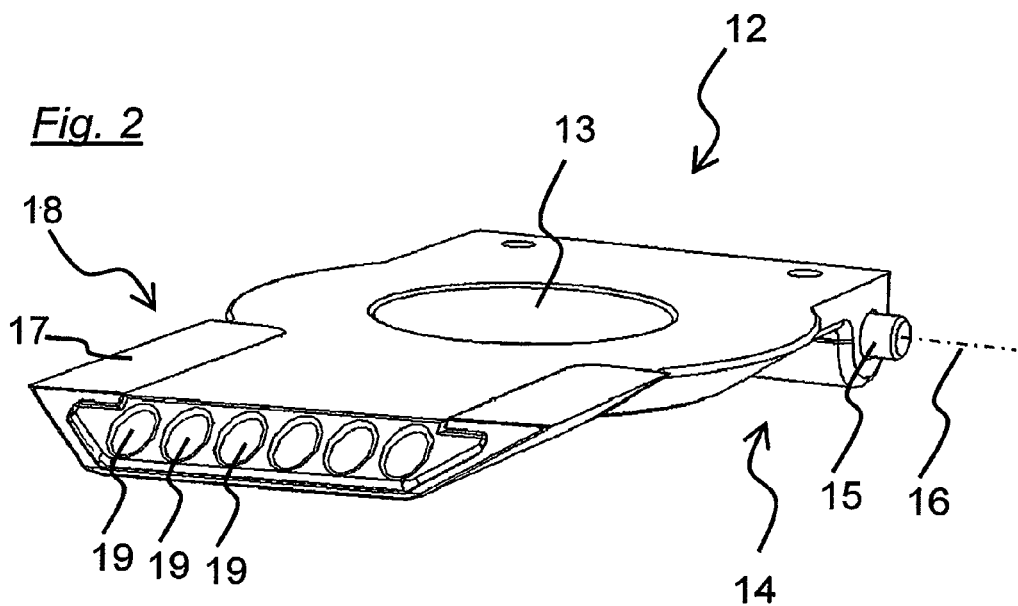
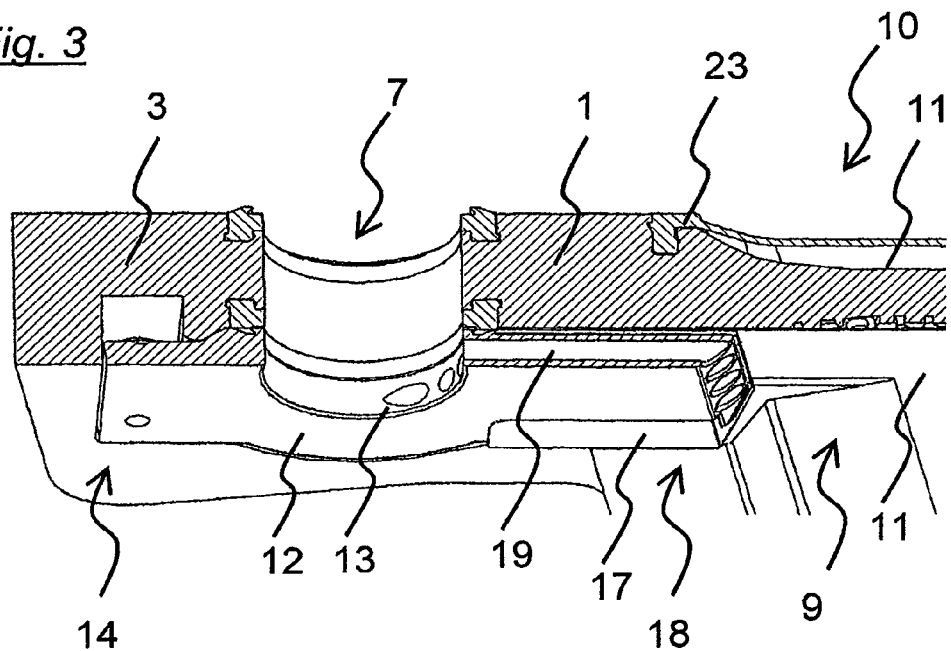

METHOD FOR FILTERING A SUSPENSION AND FILTER DEVICE

RELATED APPLICATIONS

This application claims priority from, and incorporates by reference, International patent application PCT/EP2008/056538, filed on May 28, 2008 and German patent application DE 10 2007 027 032.3, filed on Jun. 8, 2007.

FIELD OF THE INVENTION

The present invention relates generally to a filter device and method for filtering a suspension, and more particularly to a filter device and method for filtering a suspension that assures the movability of the filter cloth and simplifies detaching the filter cloth.

BACKGROUND

The invention relates, on the one hand, to a method for filtering a suspension which is initially inducted through a filling shoe into a filter chamber on a cake side of a filter cloth, permeates the filter cloth to a filtrate side of the filter cloth, and flows from the filter chamber on the filtrate side in a filtered state as a filtrate, while a solid content of the suspension is deposited on the filter cloth as a filter cake, wherein the filter chamber in a closed state of a filter device is configured between a filter plate and a counter plate, and the filling shoe is anchored in the filter plate, and clamps the filter cloth with the filter plate in a sealing manner in the closed state, and wherein the filter device is subsequently opened, so that the filter plate and the counter plate have an offset and the filter cake is removed. Furthermore the invention relates to a filter device including at least one filter chamber, which is configured between a filter plate and a counter plate when the filter device is closed, into which filter chamber a suspension can be inducted on a cake side of a filter cloth through at least one filling shoe anchored in the filter plate and clamping the filter cloth with the filter plate in a sealing manner, and the suspension can permeate the filter cloth to the filtrate side thereof, wherein a solid content of the suspension can be deposited on the filter cloth as a filter cake, and the filter plate and the counter plate are at an offset from each other when the filter device is open, and the filter cake can be removed from the at least one filter chamber.

Filter devices with a plurality of filter plates as plate stacks and filter chambers, which are respectively configured between a filter plate and a second filter plate (as a counter plate), lying in parallel on the first filter plate or standing adjacent to it, are generally known e.g. from DE 199 56 617 A1. In the filter chambers, substantially in the respective separation plane between the filter plate and the associated counter plate, one or two filter cloths and a rubber elastic membrane are disposed depending on the configuration of the filter device. Subsequently, only the filter cloth is designated as filter cloth, which is clamped tight between a filter plate and a filling shoe anchored in the filter plate in a closed state of the filter device.

During filtering operation of the known filter devices, the filter chambers are supplied through the filling shoes with a pressurized suspension, which is to be filtered, and the suspension is pressed through the filter cloths. Thus, the solid content of the suspension is deposited on the filter cloth as a filter cake. The filtered suspension from which the solid content is purged flows out from the filter chambers as a filtrate below the filter cloth substantially without pressure.

After the filtration is completed, washing and pressing the filter cake, the filter chambers are opened one after the other by moving the respective filter plate and the associated counter plate away from one another to form an offset distance. In the open state, the filter cake is either removed respectively self-acting or with mechanical devices after the filtration is completed. When the filtering properties of the filter cloths are not sufficient anymore, the filling shoes inserted into the filter plates respectively through respective recesses of the filter cloths are manually disassembled, the filter cloths are removed from the filter chambers for removing the filter cake, the filter cake is removed from the filter cloths, and the filter cloths are cleaned or replaced as required and mounted again in the filter plates for reuse with the filter shoes.

Besides the substantial manual complexity of mounting and dismounting the filter cloths, and the filling shoes anchored through clamping in the filter plates, which hinders a partial automation of the process cycle, also the service life of the filter cloths in the known filter devices is very limited. Through the high pressure loading, and depending on the method, occasional substantial temperature loading, the filter cloths extend during operation, so that the recesses provided for the filling shoes with respective seal rings do not coincide with the geometry of the filter plates after few process cycles. During filtering operation, these recesses either are not disposed exactly over the anchoring locations of the filling shoes or the filter cloth develops wrinkles between the anchoring locations. Both lead to respective leakages at the particular locations of the known filter devices, and otherwise lead to increased mechanical loading and early failure of the filter cloths.

DE 103 03 817 A1 discloses such a method in which the filling shoe is pressed out by its own weight and by the weight of the membrane, when the filter device is opened.

SUMMARY OF THE INVENTION

It is the aspect of the invention to assure the movability of the filter cloth and to simplify detaching the filter cloth.

It is another aspect of the invention to provide a method for filtering a suspension including filtering a suspension which is initially inducted through a filling shoe into a filter chamber on a cake side of a filter cloth, which then permeates the filter cloth to a filtrate side of the filter cloth, and flows from the filter chamber on the filtrate side in a filtered state as a filtrate, while a solid content of the suspension is deposited on the filter cloth as a filter cake. The filter chamber in a closed state of a filter device is configured between a filter plate and a counter plate, and the filling shoe is anchored in the filter plate, and clamps the filter cloth with the filter plate in a sealing manner in the closed state. The filter device is subsequently opened, so that the filter plate and the counter plate have an offset and the filter cake is removed, wherein the filling shoe automatically lifts off from the filter plate and releases the clamping of the filter cloth when the filter device is opened. Additionally, the filling shoe may be lifted off from the filter plate through a spring force when the filter device is opened, and the counter plate moves the filling shoe against the spring force onto the filter plate during closing.

It is another aspect of the invention to provide a filter device including at least one filter chamber, which is configured between a filter plate and a counter plate when the filter device is closed, into which filter chamber a suspension can be inducted on a cake side of a filter cloth through at least one filling shoe anchored in the filter plate and clamping the filter cloth with the filter plate in a sealing manner, and the suspension can permeate the filter cloth to the filtrate side thereof. A solid content of the suspension can be deposited on the filter cloth as a filter cake, and the filter plate and the counter plate are at an offset from each other when the filter device is open, and the filter cake can be removed from the at least one filter chamber. The at least one filling shoe is movably anchored in the filter plate, and the filling shoe is automatically lifted off from the filter plate and the clamping of the filter cloth is released when filter device is opened. Additionally, the at least one filling shoe is anchored in the filter plate and pivotable about an axis which is parallel to the filter cloth and/or the at least one filling shoe is anchored in the filter plate outside of a rectangular area covered by the filter cloth.

BRIEF DESCRIPTION OF THE DRAWINGS

The invention will be described in detail with reference to the following drawings, in which like reference numerals refer to like elements, wherein:

FIG. 2 illustrates a filling shoe of the filter device according to the invention;

FIG. 3 illustrates a sectional view of the filter device according to the invention.

DETAILED DESCRIPTION

Figure 1:
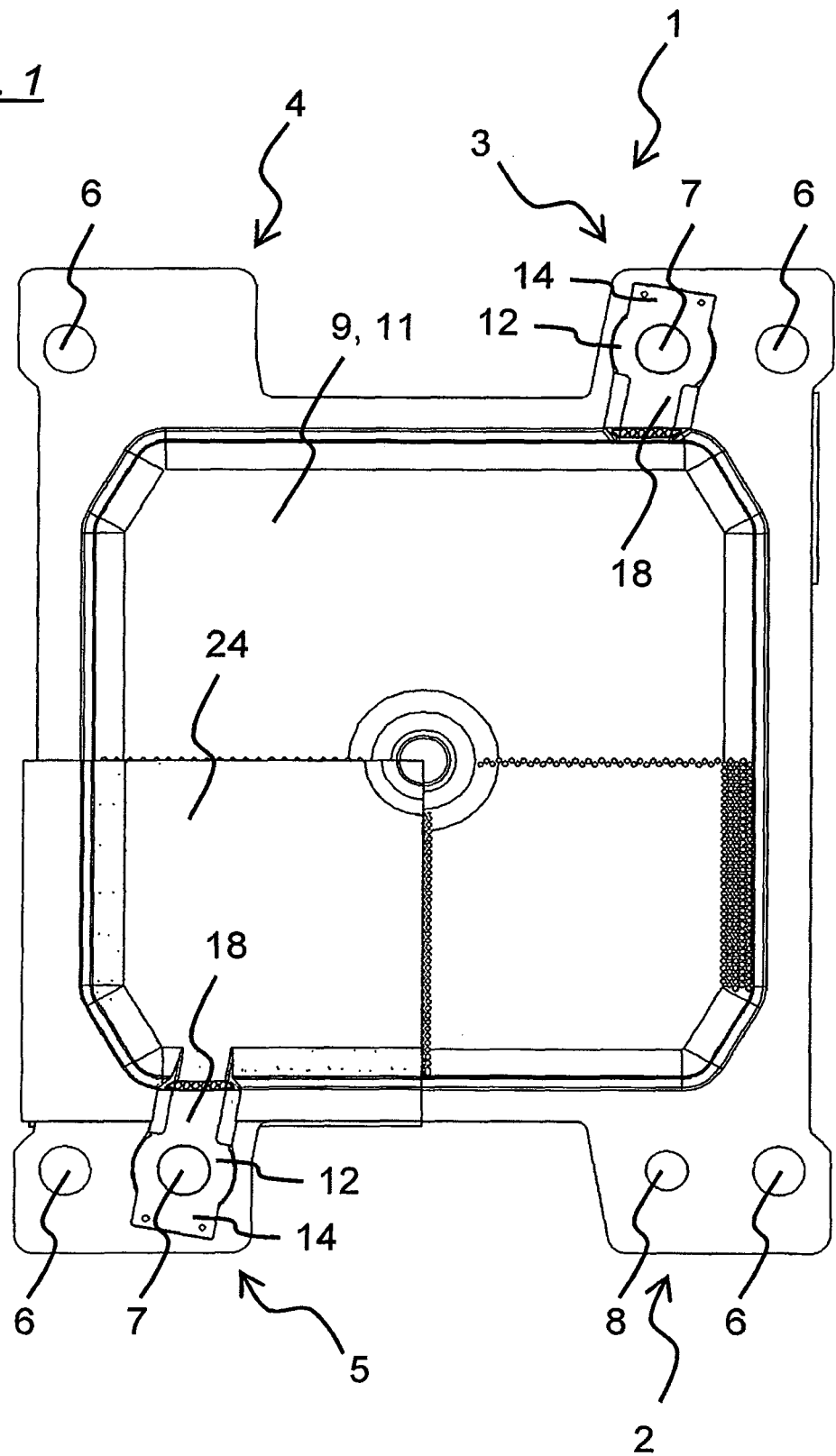
FIG. 1 illustrates a filter plate of a filter device according to the invention.

Based on the known method, it is proposed according to the invention that the filling shoe automatically lifts off from the filter plate, when the filter device is opened, which liftoff releases the clamping of the filter cloth. Thus, the method according to the invention avoids the manual complexity of mounting and dismounting the filling shoes respectively for inserting and removing the filter cloth. The method according to the invention furthermore facilitates a movability of the filter cloth relative to the filter plate.

Advantageously, the filling shoe is lifted off from the filter plate through a spring force when opening the filter device, and during the closing process, the counter plate guides the filling shoe onto the filter plate against the spring force. Using a spring element provides a particularly simple option to implement the automatic liftoff of the filling shoe. Alternatively, the filling shoe can also lift off automatically through gravity a magnetic force or it can be lifted off from the filter plate through a mechanical drive or a fluid dynamic drive.

Based on the known filter devices, it is proposed according to the invention that the at least one filling shoe is movably anchored in the filter plate, and the filling shoe is automatically lifted off from the filter plate, and the clamping of the filter cloth is removed, when the filter device is opened. The filter device according to the invention facilitates performing one of the described methods and is characterized by the advantages recited therein.

In one advantageous manner, the at least one filling shoe of a filter device according to the invention is anchored in the filter plate and pivotable about an axis parallel to the filter cloth. Thus, the clamping portion of the filling shoe, which clamps the filter cloth with the filter plate in a closed state of the filtering device, can be lifted off from the filter plate during opening, while the anchoring portion anchored in the filter plate remains substantially at the same location of the filter plate.

Tilting the filling shoe can be implemented e.g. through support bushings and pins disposed in the axle, or also without specific support elements through a particular wedging in a receiver portion of the filter plate. Alternatively, the filling shoe can be anchored as a whole, so that it is movable perpendicular to the filter cloth.

In an advantageous embodiment of a filter device according to the invention, the at least one filling shoe is anchored in the filter plate outside a rectangular area covered by the filter cloth. The outer rim of the surface covered by the filter cloth in which the filter cloth is clamped between the filter plates and seals the filter chamber is designated as sealing surface. At the filter device according to the invention, the area covered by the filter cloth and thus also the seal face has a rectangular shape.

The filling shoe anchored outside of this surface permeates the surface, so that it only becomes a pass-through element and therefore does not require specific recesses or special sealing installations in the filter cloth. The filter device according to the invention then facilitates using filter cloth by the meter without specific recesses for the filling shoes. On one side, the costs for the filter cloth are significantly reduced, on the other side, the problems described for the known filter devices through extension of the filter cloth are effectively avoided during operation.

The filter plate 1 made of PP shown in FIG. 1, which is part of a filter device according to the invention, which is not shown in more detail, has a substantially square basic shape, two load bearing extension pieces 2, 3 and two extension pieces 4, 5, which are non-load bearing and attached to this basic shape. A filtrate channel 6 respectively runs through the extension pieces 2, 3, 4, 5. Furthermore, a suspension channel 7 respectively runs through the extension piece 3 on the top left and through the extension piece 5 on the bottom right, and a pressure medium channel 8 extends through the extension piece 2 on the top right. The filtrate channels 6, the suspension channels 7 and the pressure medium channel 8 respectively extend transversal to the filter plate 1 through the filter device.

Figure 4:
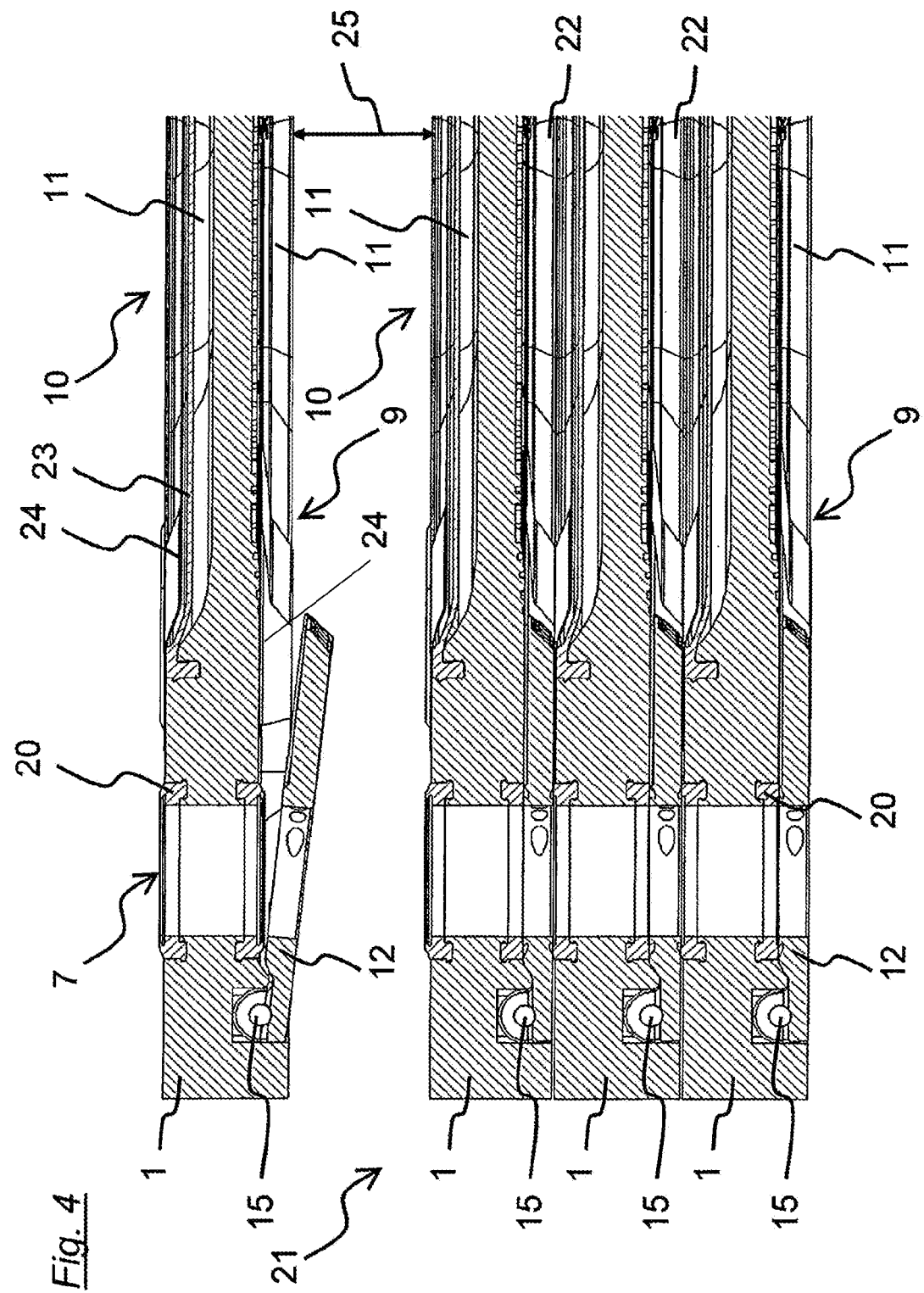
FIG. 4 illustrates another sectional view of the filter device according to the invention.

The filter plate 1 includes a chamber side 9 and a membrane side 10 placed opposite thereto, respectively configured with a lens shaped recess 11, which is illustrated in FIGS. 3 and 4. At the chamber side 9, two filling shoes 12 made of PP are anchored, which are disposed laterally at the recess 11 and diagonally opposed, through which filling shoes the suspension can be inducted into the filter device from the respectively associated suspension channel 7.

As illustrated in FIG. 2, each filling shoe 12 includes a suspension bore hole 13. In an anchoring portion 14, the filling shoe 12 includes a support axis 16 defined by two support pinions 15. Opposite to the anchoring portion 14, the filling shoe 12 includes a clamping portion 18 provided with a seal element 17 made of rubber, wherein six inlet channels lead to said clamping portion starting at the suspension bore hole 13.

In assembled state, the suspension bore hole 13 of the filling shoe 12 forms a section of the associated suspension channel 7 of the filter plate 1 as illustrated in FIG. 3. The support pinions 15 engage support bushings of the filter plate 1, which are not shown, so that the filling shoe 12 is anchored in the filter plate 1, and supported thereon pivotable about the support axis 16. With respect to the filter plate 1 and the counter plate, not shown in FIG. 3, the suspension bore hole 13 of the filling shoe 12 is sealed through circular annular seal elements 20.

During operation of the filter device according to the invention, a so-called membrane filter press with vertically oriented filter plates 1, the filter plates 1 are compressed in a steel frame of a press frame, which is not shown, to form a plate pack 21, which is shown in a detail in FIG. 4. In the plate pack 21, the recesses 11 of the adjacent filter plates 1 form respective filter chambers 22, wherein a respective filter plate 1 with its chamber side 9 is combined with the membrane side 10 of an additional filter plate 1 as a counter plate. In the separation plane between the filter plate 1 and the counter plate, one membrane 23 made from rubber and two filter cloths 24 are disposed respectively in the filter chamber 22.

In order to assemble the filter device, the filter plates 1 are supported at the frame through the upper extension pieces 2, 3. The extension piece 45 at the bottom right is only bolted to the filter plates 1 after they are hung into the support frame. The other extension pieces 2, 3, 4 are integrally formed at the filter plates 1. When closing the filter chambers 22, the filter cloth 24 disposed between the filter chamber 22 and the clamping portion 18 of the filling shoe 12 is clamped there between.

During filtering operation of the filter device, a suspension with a solid content is inducted through the filling shoes 12 respectively between the adjacent cake sides of the filter cloths 24 and into the filter chambers 22. During filtration, the suspension initially permeates the filter cloths 24 towards their filtrate sides and flows as a cleaned filtrate substantially without pressure from the filter chambers 22 into outlets, which are not shown. Thus, the solid content of the suspension is deposited on the cake sides of the filter cloths 24 as a filter cake, which is not shown.

In order to remove the filter cake, the filter chambers 22 of the filter device are opened one after the other, so that they include a distance 25, through which the filter cake can be removed. When opening the filter chamber 22, the seal element between the filter plate 1 and the filling shoe 12, acting as a spring element, prevents an upward tilting of the filling shoe 12. The clamping of the filter cloth 24 is thus automatically removed and it can be removed easily, in particular without disassembling the filling shoe 12.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

REFERENCE NUMERALS AND DESIGNATIONS 1 filter plate
2 extension piece
3 extension piece
4 extension piece
5 extension piece
6 filtrate channel
7 suspension channel
8 pressure medium channel
9 chamber side
10 membrane side
11 recess
12 filling shoe
13 suspension bore hole
14 anchoring portion
15 support pinion
16 support axle
17 seal element
18 clamping portion
19 inlet channel
20 seal element
21 plate pack
22 filter chamber
23 membrane
24 filter cloth
25 offset

What is claim is:

1. A method for filtering a suspension, comprising the step:
   filtering a suspension which is initially inducted through a filling shoe into a filter chamber on a cake side of a filter cloth, which then permeates the filter cloth to a filtrate side of the filter cloth, and flows from the filter chamber on the filtrate side in a filtered state as a filtrate, while a solid content of the suspension is deposited on the fitter cloth as a filter cake,
   wherein the filter chamber in a closed state of a filter device is configured between a filter plate and a counter plate, and the filling shoe is anchored in the filter plate, and clamps the filter cloth with the filter plate in a sealing manner in the closed state,
   wherein the filter device is subsequently opened, so that the filter plate and the counter plate have an offset and the fitter cake is removed; and
   wherein the filling shoe automatically lifts off from the filter plate and releases the clamping of the filter cloth when the filter device is opened.

2. A method according to claim 1, wherein the filling shoe is lifted of from the filter plate through a spring force when the filter device is opened, and the counter plate moves the filling shoe against the spring force onto the filter plate during closing.

3. A filter device, comprising:
   at least one filter chamber, which is configured between a filter plate and a counter plate when the filter device is closed, into which filter chamber a suspension is inducted on a cake side of a fitter cloth through at least one filling shoe anchored in the filter plate and clamping the filter cloth with the filter plate in a sealing manner, and the suspension permeates the filter cloth to the filtrate side thereof,
   wherein a solid content of the suspension is deposited on the filter cloth as a filter cake, and the filter plate and the counter plate are at an offset from each other when the filter device is open, and the filter cake is removable from the at least one filter chamber,
   wherein the at least one filling shoe is movably anchored in the filter plate, and the filling shoe is automatically lifted off from the filter plate and the clamping of the filter cloth is released when filter device is opened.

4. A filter device according to claim 3, wherein the at least one filling shoe is anchored in the filter plate and pivotable about an axis which is parallel to the filter cloth.

5. A filter device according to claim 3, wherein the at least one filling shoe is anchored in the filter plate outside of a rectangular area covered by the filter cloth.

6. A filter device according to claim 4, wherein the at least one filling shoe is anchored in the filter plate outside of a rectangular area covered by the filter cloth.

* * * * *